(12) United States Patent
Lavelle et al.

(10) Patent No.: US 6,847,369 B2
(45) Date of Patent: Jan. 25, 2005

(54) OPTIMIZED PACKING OF LOOSE DATA IN A GRAPHICS QUEUE

(75) Inventors: Michael G. Lavelle, Saratoga, CA (US); Ewa M. Kubalska, San Jose, CA (US); Anthony S. Ramirez, Palo Alto, CA (US); Huang Pan, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/060,915

(22) Filed: Jan. 30, 2002

(65) Prior Publication Data

US 2003/0142105 A1 Jul. 31, 2003

(51) Int. Cl.[7] .............................................. G09G 5/36
(52) U.S. Cl. ...................... 345/558; 345/419; 345/503; 345/522; 345/520; 710/305; 710/310

(58) Field of Search ............................. 710/52, 53, 55, 710/100, 305, 306, 307, 310; 345/419, 503, 522, 520, 558

(56) References Cited

U.S. PATENT DOCUMENTS 5,905,502 A * 5/1999 Deering ...................... 345/420
6,230,228 B1 * 5/2001 Eskandari et al. .......... 710/310

* cited by examiner

*Primary Examiner*—Ulka J. Chauhan
(74) *Attorney, Agent, or Firm*—Meyertons Hood Kivlin Kowert & Goetzel, P.C.; Jeffrey C. Hood (57) ABSTRACT

A data queue optimized for receiving loosely packed graphics data and suitable for use in a computer graphics system is described. The data queue operates on first-in-first-out principals, and has a variable width input and output. The variable width on the input side facilitates the reception and storage of loosely packed data. The variable width output allows for the single-cycle output of multi-word data. Packing of the data occurs on the write-side of the FIFO structure.

38 Claims, 9 Drawing Sheets

ОПТIMIZED PACKING OF LOOSE DATA IN A GRAPHICS QUEUE

BACKGROUND OF THE INVENTION

1. Field of the Invention

This invention relates generally to the field of computer graphics and, more particularly, to render pipelines.

2. Description of the Related Art

With each new generation of graphics system, there is more image data to process and less time in which to process it. This consistent increase in data and data rates places additional burden on the interconnect systems tasked with moving data between graphics sub-systems. In addition to the volume of graphics data and the speed with which it must be handled, there are often problems encountered associated with the synchronicity of data. Frequently it is found that individual components of the graphics stream have varying processing times associated with them, making the use of a synchronous stream difficult or inefficient.

In order to move large amounts of high-speed data from one sub-system to another, wide, high-speed buses are often constructed. One example of such a bus may be represented by UPA (Ultra Port Architecture). Due to the non-continuous nature of some types of graphics data, the bus may not be fully utilized. The unused bus capacity may be observed as empty or invalid data words embedded in the stream. These empty data words may adversely affect the optimal performance of down-stream elements in the render pipe-line if these elements are designed to operate synchronously, and if they are dependent on multiple word data.

The use of FIFO type memories is effective in regulating streams where the data rate may be variable. However, the use of a FIFO may be problematic where the interfacing bus is wide, and contains sporadically placed empty data words. Therefore, for these reasons, a system and method for improving the packing of data in a graphics queue, is highly desired. A system and method is also desired for improved retrieval of data from a graphics queue, wherein ordering of the graphics data is maintained during retrieval of the graphics data.

SUMMARY OF THE INVENTION

The problems set forth above may at least in part be solved in some embodiments by a system or method for improving the packing of data in a graphics queue. In one embodiment, the system may include a bus interface configured to receive parallel graphics data and an integer number of data enables on a wide, high-speed bus. The parallel graphics data may be subdivided into an integer number of data words, and one or more data enables may be associated with each data word. The data enables may be asserted to indicate which portions of the bus contain active or valid data.

The bus interface may also comprise a plurality of input multiplexers, configured to select any one of the multiple data words transferred on the bus. A plurality of FIFO (first-in-first-out) memories may be coupled to the input multiplexers, and configured to receive and store the data words output by the input multiplexers. A write controller may maintain a next write register, which indicates the next FIFO to receive to data. The write controller may also generate control signals for the input multiplexers and FIFOs based upon the contents of the next write register and the data enables.

The system may further comprise a plurality of output multiplexers coupled to the FIFOs, and each configured to output a data word retrieved from one of the FIFOs. The FIFO read-side control signals and the output multiplexer controls may be generated by a read controller, configured to handle requests for graphics data. The read controller may maintain a next read register which indicates the next FIFO to retrieve data from.

As noted above, a method for improving the packing of data in a graphics queue is also contemplated. In one embodiment, the method includes receiving graphics data, represented by a plurality of parallel data words. The parallel data words may be examined to determine if any data words are not enabled or do not contain valid data. Each of the enabled data words may be selected and stored in a FIFO memory. The FIFO memories may be accessed in repetitive, circular fashion, and a write position pointer may be maintained to indicate the FIFO least recently accessed by a write operation. A read controller may maintain a similar read position pointer, indicating the FIFO least recently accessed by a read operation. The read controller may receive requests for graphics data, and retrieve the data from the FIFOs according to the contents of the read position pointer. The outputs of the FIFOs containing the requested data may be reordered in order to maintain the original sequential interrelationship of the data words, and output to the requesting processing block.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System

Figure 1:
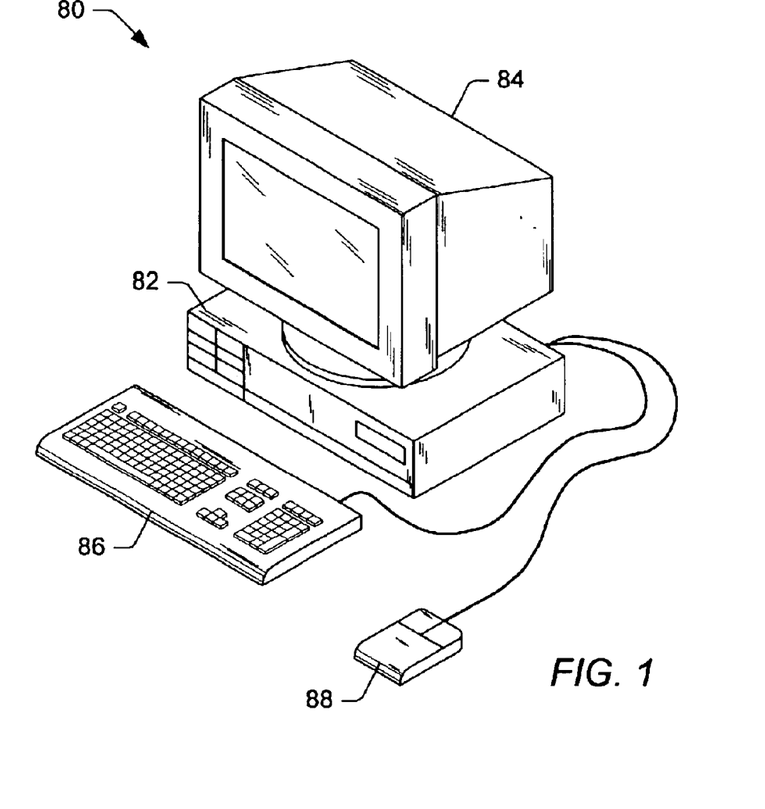
FIG. 1 is a perspective view of one embodiment of a computer system.

Referring now to FIG. 1, one embodiment of a computer system 80 that includes a graphics system that may be used to implement one embodiment of the invention is shown. The graphics system may be comprised in any of various systems, including a computer system, network PC, Internet appliance, a television, including high definition television (HDTV) systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices including cathode ray tube (CRT), liquid crystal display (LCD) or gas-plasma display. Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
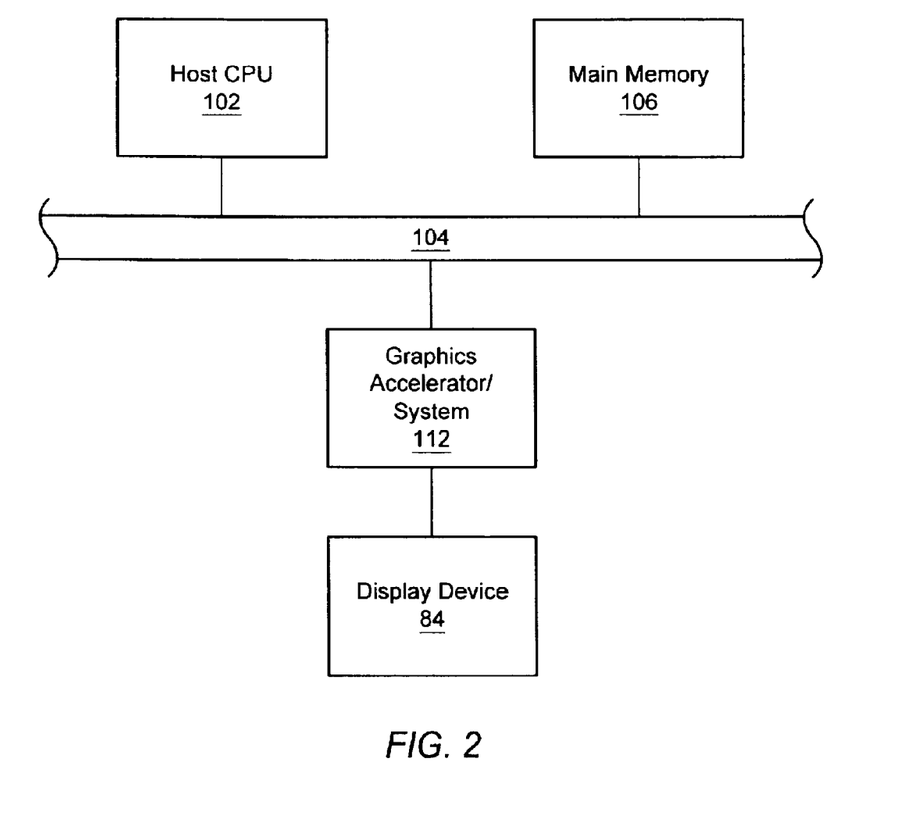
FIG. 2 is a simplified block diagram of one embodiment of a computer system.

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Figure 3:
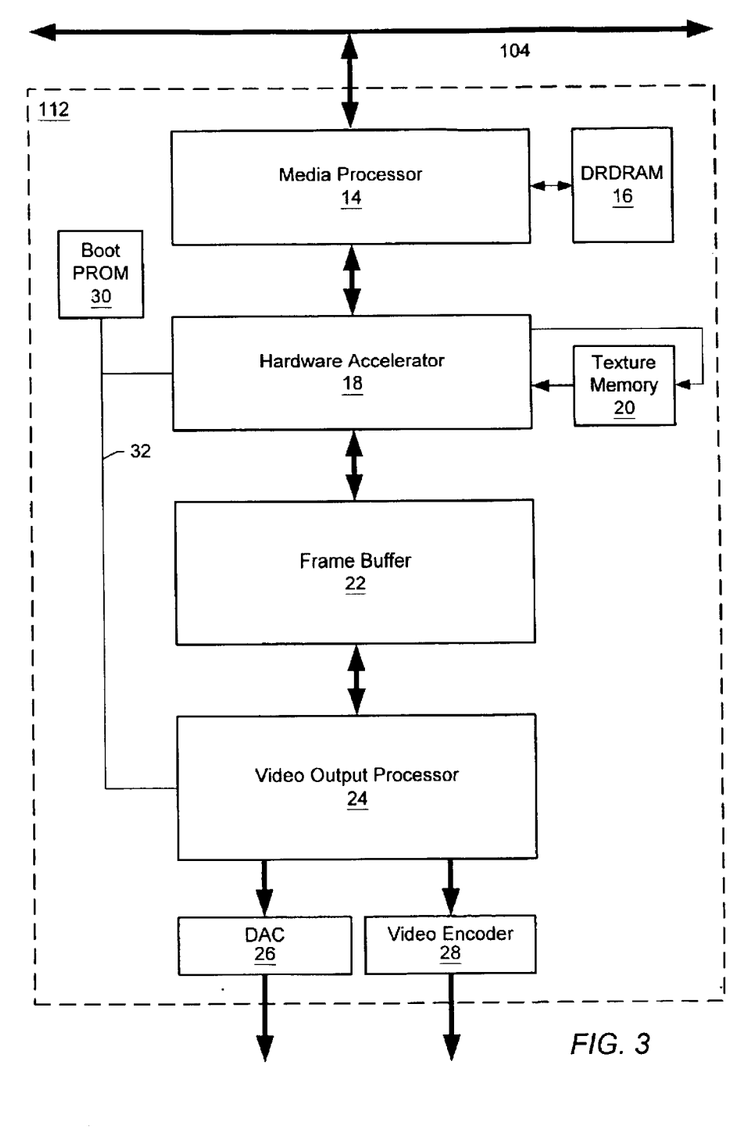
FIG. 3 is a functional block diagram of one embodiment of a graphics system.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Graphics System

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, digital signal processors (DSPs), or general purpose processors).

In some embodiments, one or more of these components may be removed. For example, the video output processor may be excluded from an embodiment that does not provide video output signals to drive a display device. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Media Processor

Figure 4:
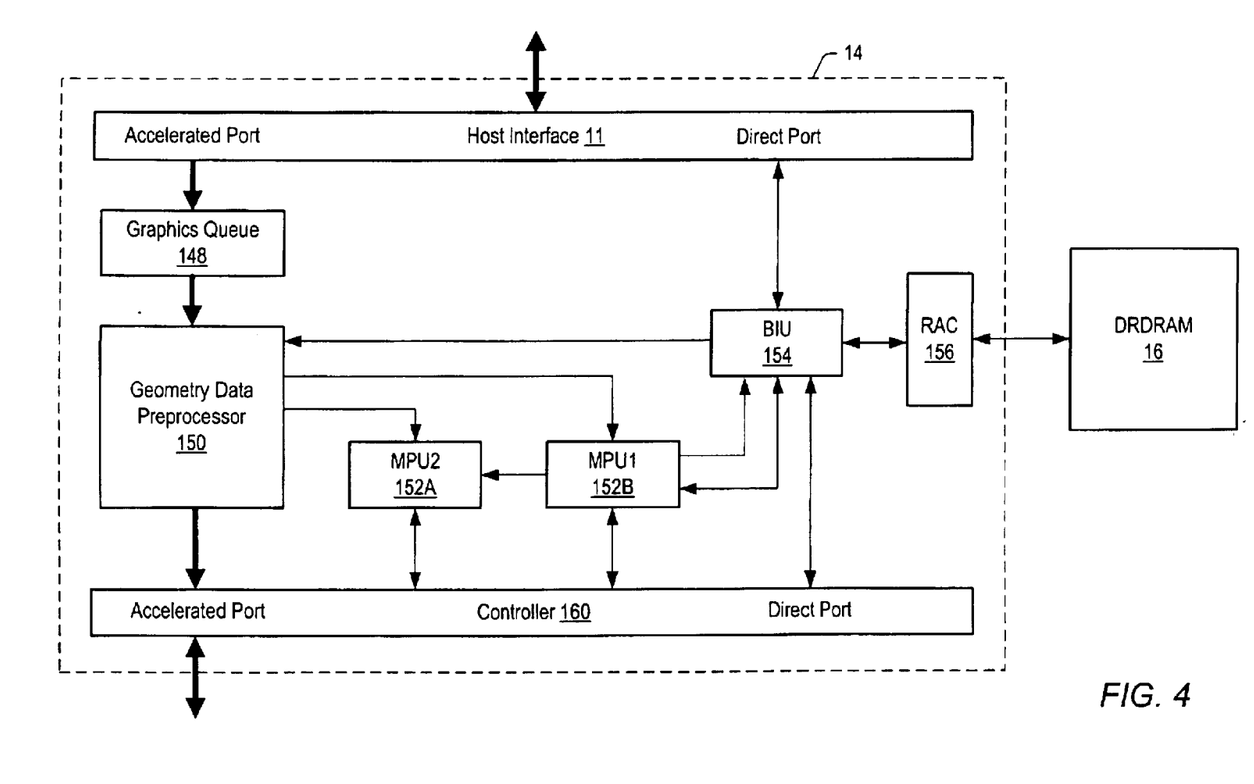
FIG. 4 is a functional block diagram of one embodiment of the media processor of FIG. 3.

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Hardware Accelerator

Figure 5:
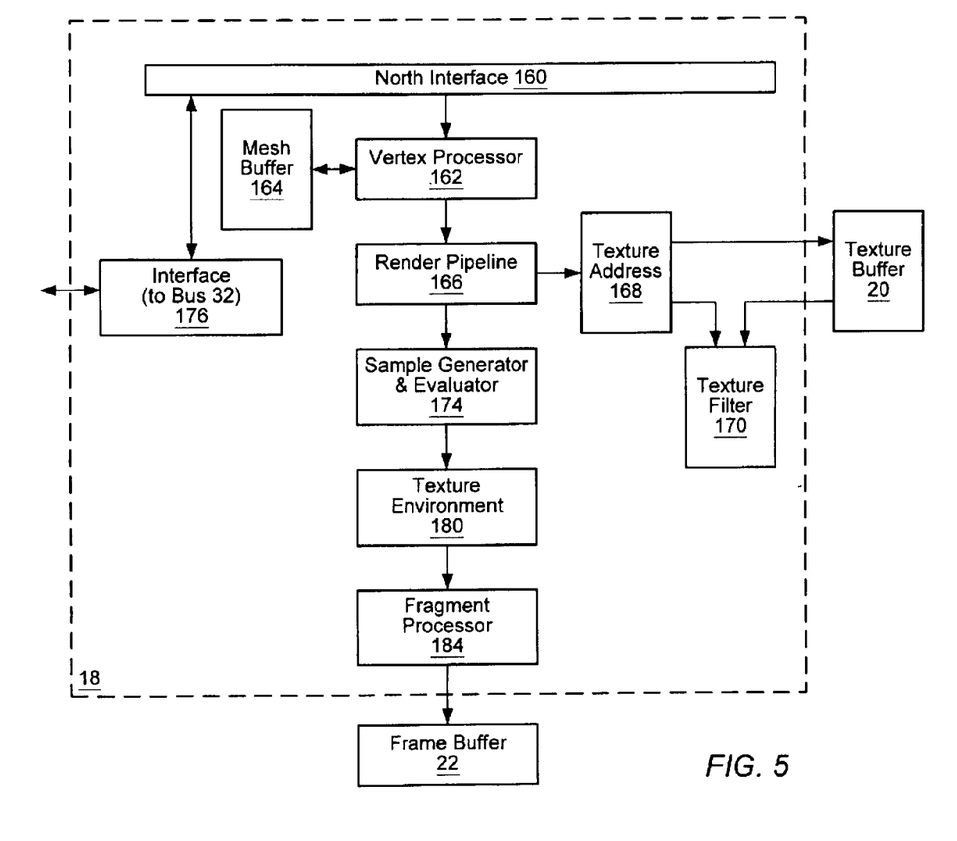
FIG. 5 is a functional block diagram of one embodiment of the hardware accelerator of FIG. 3.

Referring now to FIG. 5, one embodiment of the hardware accelerator 18 is shown. One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM (programmable read-only memory) 30 and/or video output processor 24. Boot PROM 30 may be configured to store system initialization data and/or control code for frame buffer 22. Hardware accelerator 18 may communicate with texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator and evaluator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and request texels from the texture buffer 20 (as described in greater detail below). The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator and evaluator 174. The texture environment 180 may also be used to perform geometric transformations on images (e.g., bilinear scale, rotate, flip) as well as to perform other image filtering operations on texture buffer image data (e.g., bicubic scale and convolutions).

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Video Output Processor

In some embodiments, a video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency, plane group extraction, gamma correction, pseudocolor or color lookup or bypass, and/or cursor generation. In one embodiment, frame buffer 22 may include multiple 3DRAM64 devices that include the transparency overlay function and all or some of the lookup tables. Video output processor 24 may also be configured to support two video output streams to two displays using the two independent video raster timing generators. For example, one raster (e.g., 196A) may drive a 1280×1024 CRT while the other (e.g., 196B) may drive a NTSC or PAL device with encoded television video.

In one embodiment, the video output processor 24 may directly output digital pixel data in lieu of analog video signals. This may be useful when a display device is based on a digital technology (e.g., an LCD-type display or a digital micro-mirror display).

DAC and Encoder

In some embodiments, the video output processor 24 may be configured to output a stream of digital video data to a DAC (digital to analog converter) 202. The DAC 202 may, in turn be configured to provide a high resolution RGB analog video output at dot rates of 240 MHz. This analog video output may be used to drive a display device such as a cathode ray tube (CRT) monitor. In some embodiments, the video output processor 24 may also output a stream of digital video data to one or more encoders 200. Each encoder 200 may be configured to supply an encoded video signal to a display (e.g., encoded NTSC or PAL video).

Vertex Processor

Figure 6:
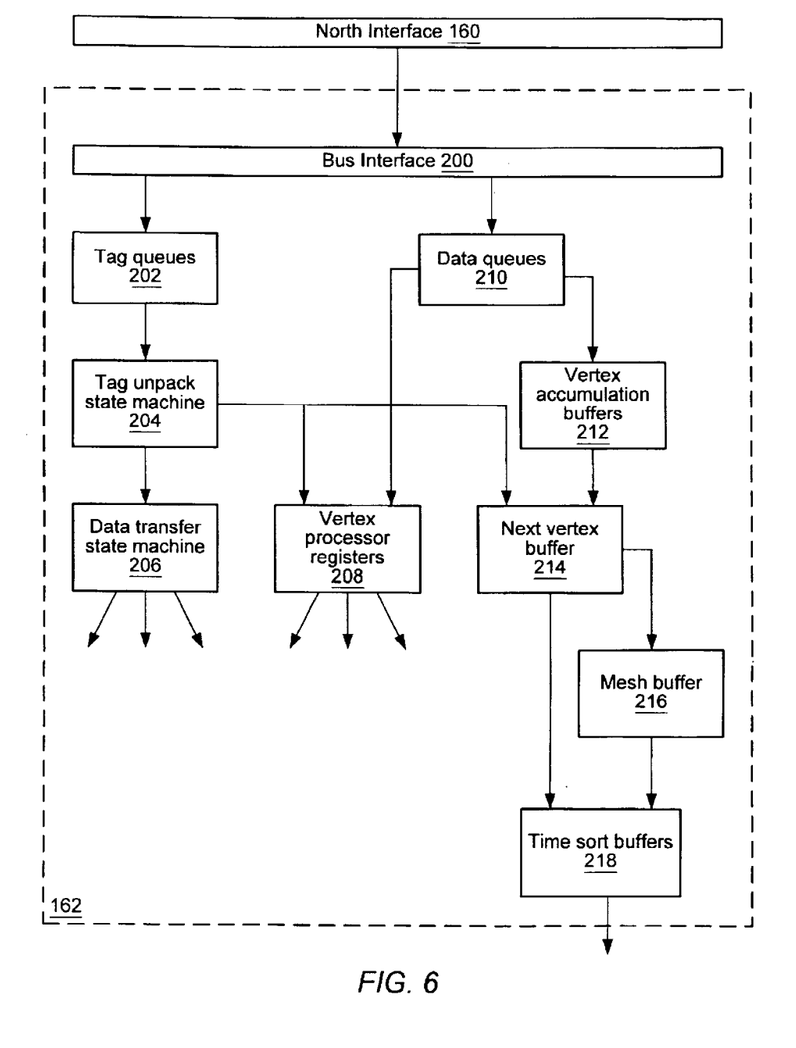
FIG. 6 is a simplified block diagram of one embodiment of the vertex processor of FIG. 5.

Turning now to FIG. 6, a simplified block diagram of one embodiment of a vertex processor is shown. In the illustrated embodiment, the bus interface 200 may be configured to receive information communicated on a bus representing a UPA (Ultra Port Architecture) architecture variant. The information transmitted on the bus may take the form of packets, where each packet may be introduced (i.e., message preamble) with a tag. The tag may contain information concerning the nature of any data following the tag, such as how many data words are expected, or where the data words are to be stored.

Information received by the bus interface 200 may be buffered and distributed to the two queues. The width of the bus may be 64 binary bits, and may be logically subdivided into four 16-bit halfwords, each halfword being further divisible into two bytes. In parallel with the bus data, two byte enable bits may be sent for each halfword (i.e., 8 byte enable bits). The byte enable bits may be used to indicate which bytes contain valid data during data transfer cycles. In one embodiment, the data transmitted on the bus may be aligned on halfword (even byte address) boundaries, and may be sent in byte pairs (i.e., halfwords are sent). In other embodiments, the transmitted data may be aligned on word boundaries (i.e. byte address that is an exact multiple of 4).

The tag queues 202 may be configured to receive and store the tags from the bus interface 200. These tags may be justified, reordered, and then pushed onto FIFO (first-infirst-out) storage structures until the tag unpack state machine 204 is ready to process them. (The internal operation of the tag queues 202 is described in greater detail below.) The tags may contain information regarding any associated data transmitted after the tag, this information may identify the data as being one of three basic types; register write data, vertex data, or attribute data.

A register write tag received in the tag queues may indicate that the next two 16-bit halfwords received are to be treated as register data. The two halfwords may therefore be received and pushed onto the tag queues. As the corresponding tag is unpacked and decoded by the tag unpack state machine 204, the data (6 bytes of data, 2B register tag plus 4B register data) may be removed from the tag queues 202 and transferred to the vertex processor registers 208. The register receiving the data may be specified by a register address embedded in the tag. In this way, the media processor 14 may control and configure the vertex processor 162. Additionally, information transmitted in this manner may allow for the media processor 14 to order 2d and 3d primitives.

Vertex data tags (halfword size, 2B) received in the tag queues may indicate that a series of words, doublewords or quadwords is to follow which are descriptive of one vertex of a geometric primitive. There may also be information embedded within the tag which describes how the vertex data is to be processed (i.e., push the vertex onto one of the data queues 210, push vertex onto the mesh buffer 216, etc.). In some embodiments, a vertex data tag may introduce a variable-length stream of information associated with one vertex. In these cases, the stream may be subdivided into several different components, each component conveying unique information (e.g., X, Y, Z and W coordinates, front face RGB values, back face RGB values, specular values, texture coordinates, etc.). The data received in the stream may be temporarily stored in one of the data queues until the vertex accumulation buffers 212 are ready to process it. In one embodiment, the receipt of a pre-defined component may be used to terminate the stream. In this case, the terminating component may be selected by writing the component type to one of the vertex processor registers 208.

In one embodiment, tags received which correspond to attribute data may introduce a series of doublewords or quadwords targeted for the vertex processor registers 208. The attribute data may be received and pushed onto the data queues 210, where the data may be temporarily stored until transfer to the appropriate registers may be accomplished. Each packet of the attribute data may contain a target register address and the data to be written into the register. In one embodiment, the attribute data may be terminated by a write to a reserved register address. Since one tag may be associated with a multiplicity of attribute data, this method may be more efficient for writing to large blocks of vertex processor registers 208 than the register tag method described above.

In some embodiments, the tag unpack state machine 204 may be configured to maintain status information of the individual queues within the tag queues 202, track pushes and pops onto the queues, and the location of tags within the queue structure. In other embodiments, a subset of these functions may be performed within the tag queues 202. The tag unpack state machine 204 may examine each tag as it is conveyed from the tag queues 202, and extract sequencing information embedded within the tag. The sequencing information may be decoded, and any additional, associated tags may be popped off the tag queues 202 (e.g., in the case where an examined tag is determined to indicate a register data transfer, two additional halfwords may be popped off the tag queues and routed to the vertex processor registers 208). In one embodiment, the tag unpack state machine 204 may convey an encoded operation code to the data transfer state machine 206 in response to determining the nature of the tag, this operation code may contain information regarding the source and target locations of data to be transferred throughout the vertex processor 162. In other embodiments, the tag may be popped off the tag queues 202, and transferred directly to the data transfer state machine 206 by the tag unpack state machine 204.

In one embodiment, the data transfer state machine 206 may be configured to receive tags from the tag unpack state machine 202. The data transfer state machine may decode the tags, determine the implied data transfers, and issue the appropriate control signals the functional blocks of the vertex processor 162. Through the control signals, the data transfer state machine 206 may initiate the transfer of vertex data (e.g., from the vertex accumulation buffers 212 to the mesh buffer 216 or to the time sort buffers 218), and affect updates to the vertex processor registers 208.

In some embodiments, there may be a large number of vertex processor registers 208, ranging in size from a single bit to 32 bits in width. The contents of the vertex processor registers 208 may be altered directly through the use of register write tags, and alternately, attribute tags may be used for modifying large blocks of registers. The function of an individual register may vary, it may be a hardware control function (e.g., setting the high-water mark for the tag queues 202 and data queues 210), a transfer control function (e.g., specifying the number of vertices to be included in a packet), or attribute data to be applied to one or more vertices (e.g., color and transparency values).

In some embodiments, the data queues 210 may be configured to receive and provide short-term storage for vertices and attribute data. The data queues 210 may be a small FIFO memory structure, and in some embodiments, more than one data queue 210 may be available. In cases where there is more than one data queue 210 in the vertex processor 162, and more than one MPU 152 in the media processor 14, each data queue 210 may be associated with a single MPU 152.

In one embodiment, vertices may be built in the vertex accumulation buffers 212 from the constituent elements. This building process may involve combining data from the data queues 210 with attribute information stored in the vertex processor registers 208. The width of the vertex accumulation buffers 212 may be configured to accommodate all the information associated with a vertex before lighting is applied. This information may include some or all of the following; X, Y and Z coordinates, clipping information, texture coordinates, color values for both front and back faces, and transparency (alpha) values.

In one embodiment, the next vertex buffer 214 may receive vertex information from either the vertex accumulation buffers 212, or directly as a result of register write operations. An input multiplexer within the next vertex buffer 214 may choose between the two input sources, and may be controlled by signals received from the data transfer state machine 206. Vertex information stored temporarily in the next vertex buffer 214 may be routed to either the mesh buffer 216 or the time sort buffers 218.

In some embodiments, individual vertices used more than once may be temporarily stored in a mesh buffer 216. If, for example, an area to be displayed is composed of triangles, then one vertex may be common to two or more adjacent triangles. In these cases, saving the common vertices in the mesh buffer 216 may mitigate redundant data transfers, with geometric primitives assembled from a combination of inbound vertices, and vertices stored in the mesh buffer 216.

In one embodiment, the concept of a geometric primitive first becomes realized in the time sort buffers 218. The time sort buffers 218 may be configured to receive vertex information from the next vertex buffer 214 or the mesh buffer 216. The source of the vertex information may be controlled by signals received from the data transfer state machine 206. Within the time sort buffers 218, entire primitives may be built from the selected vertices and then output to the render pipeline 166

Tag Queues

Figure 7:
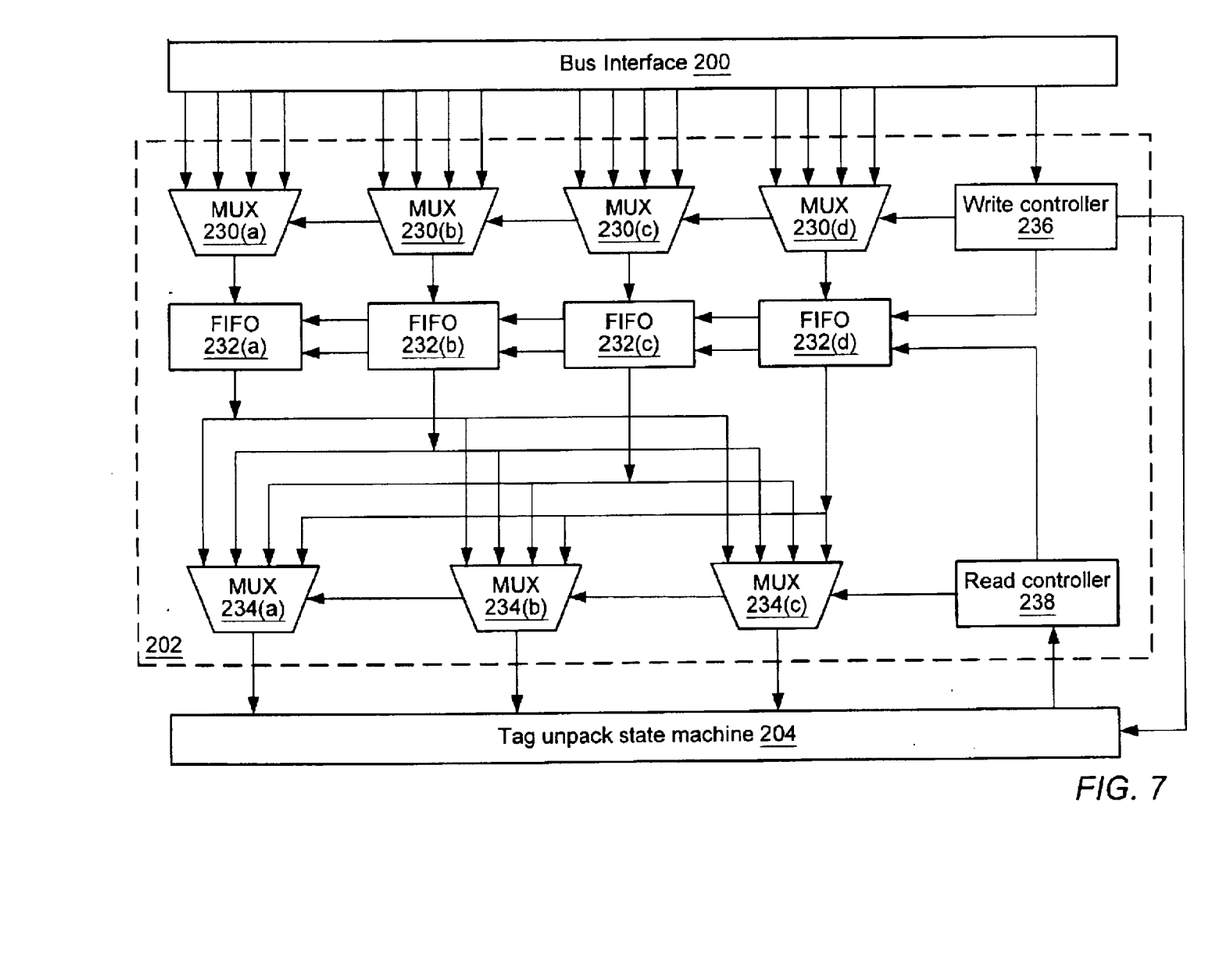
FIG. 7 is a simplified block diagram of one embodiment of the tag queues of FIG. 6.

Turning now to FIG. 7, one embodiment of the tag queues 202 is illustrated. Each of the four MUXs 230 may be configured to receive a full bus width of information (i.e., 64 bits), and to output a single halfword (i.e., 16 bits). Thus, any of the four FIFOs 232 may receive any one of the four halfwords received from the bus. The write controller 236 may receive byte enable information from the bus interface 200 indicative of the active bytes within the four halfwords, and may combine this information with historical status information of the four FIFOs 232 (i.e., the last FIFO written to). From the combination of these two pieces of information, the write controller 236 may generate the multiplexer control signals, write enables, and write controls appropriate for pushing the pending tag data onto the FIFOs 232. As the tag data is pushed onto the queue, the write controller 236 may update the historical status information, indicating the last FIFO 232 device written to as part of the most recent operation. Additionally, the write controller 236 may check the FIFOs 232 for available space and stall the media processor 14 upon determination that a predetermined high-water mark has been reached. The write controller 236 may also signal the tag unpack state machine 202 that tag data is available in the tag queue 202 for processing.

In the illustrated embodiment, the read controller 238 may receive control signals from the tag unpack state machine 202 requesting data. These control signals may include information regarding the amount of data requested. In response to a request for data, the read controller 238 may utilize historical status information (i.e., the last FIFO read from) to generate read controls which may then be conveyed to the FIFOs 232. Additionally, the read controller 238 may generate the appropriate control signals for the output MUXs 234. Each of the output MUXs 234 may be directed to output a halfword from a single FIFO 232, selecting the FIFOs 232 properly so that the original ordering of the halfwords is retained. In response to a request for data, one, two or three halfwords may be transferred to the tag unpack state machine 204. In one embodiment, the write controller 236 and the read controller 238 may be coupled in order to synchronize the starting write and read positions.

Thus, the tag queues 202 may be configured to perform in a fashion similar to a circular buffer, where the width of the read and write data may be independently variable. Hence by pushing only active halfwords onto the FIFOs 232, the tag queues 202 may potentially offer the same level of functionality as a much larger fixed word width FIFO (i.e., a 64 bit wide FIFO).

Figure 8:
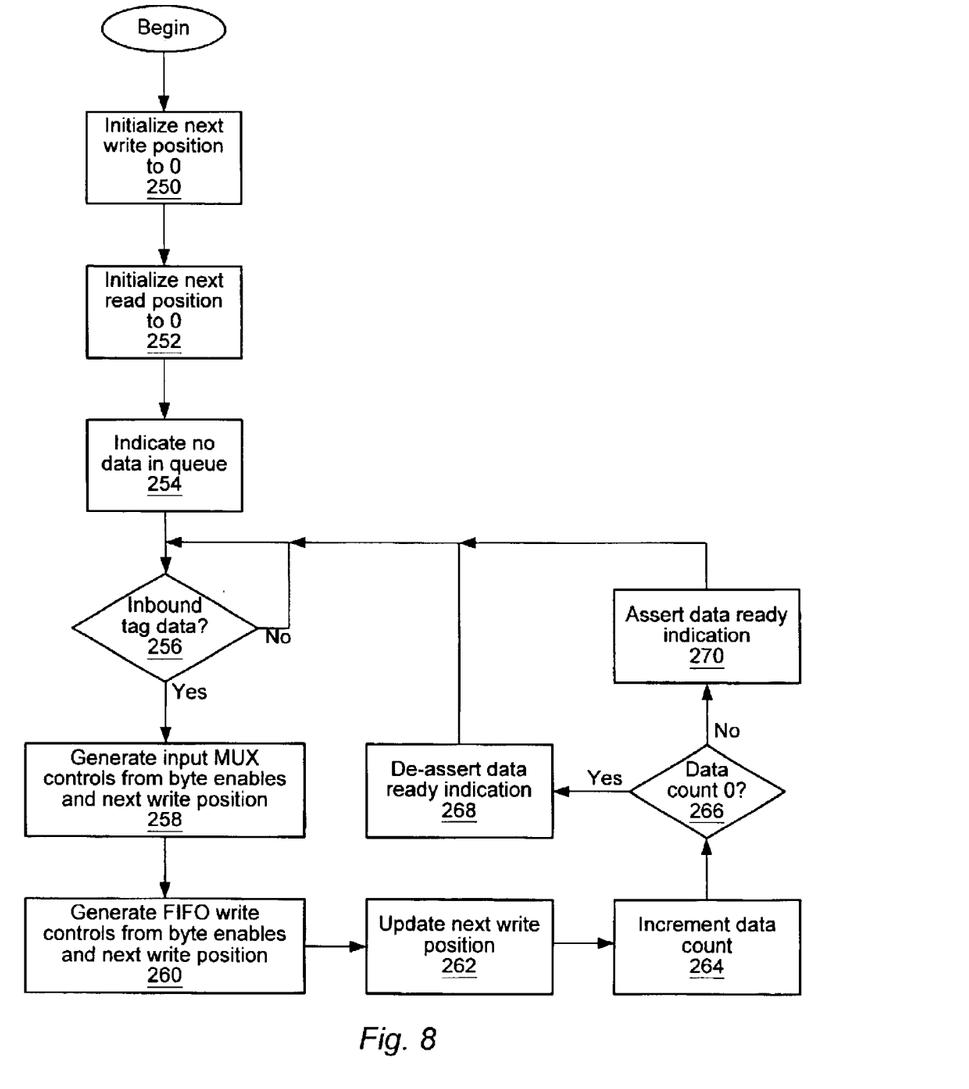
FIG. 8 is a flow diagram illustrating one embodiment of a method for storing tag data in the tag queues.

Turning now to FIG. 8, a flow diagram representing one embodiment of a method for storing tag data in the tag queues 202 is illustrated. The illustrated method may be entered upon system power up or some other convenient board level reset, and begin by initializing the next write position to zero (step 250). The next write position may be a two bit address indicating which of the four FIFOs 232 is to receive the next halfword. The next read position may then be likewise initialized to 0 (step 252) and the flag indicating that there is data available in the queue may be de-asserted (step 254). The process may then stall while waiting for any inbound tag data (step 256).

Once inbound tag data is detected, the byte enables associated with the tag data and the next write position may be combined to generate the input multiplexer signals (step 258). In some embodiments, the data is received by the tag queues 202 in byte pairs (halfwords), and may be aligned on halfword boundaries. In these cases therefore, it may be necessary to examine only four of the eight byte enable signals (i.e., the enables corresponding to the first byte of each quadword). This, coupled with the fact that the next write position may be implemented with two bits yields a total of $2^6$ or 64 possible conditions affecting the state of the input multiplexers. Therefore, the generation of the input multiplexer control lines may be implemented in combinatorial logic, or a small, hard-wired look-up table (LUT).

Next, the byte enables and the next write position may be combined and utilized to generate the FIFO 232 write controls (step 260). Similar to the generation of the input multiplexer controls, the generation of the FIFO write controls may also be implemented in combinatorial logic or a small LUT, there being only 16 possible conditions to consider.

Once the data has been transferred to the FIFOs 232, the next write position may be updated to reflect the most recent write operation (step 262). This may be accomplished by summing the value of the next write position with the number of halfwords written, and truncating the result of the summation to two bits. Next, a counter indicating the amount of available data in the tag queues 202 (i.e., the number of valid halfwords available) may be incremented by the number of halfwords written (step 264). The data count may then be tested for equality to zero (step 266), and if it is determined that the data count is not equal to zero (i.e., valid halfwords available in the queue), then the flag indicating available data may be asserted (step 270). If, however, the data count is equal to zero, then the flag indicating available data may be de-asserted (step 268). Once the flag has been updated, the process may branch back to step 256.

Figure 9:
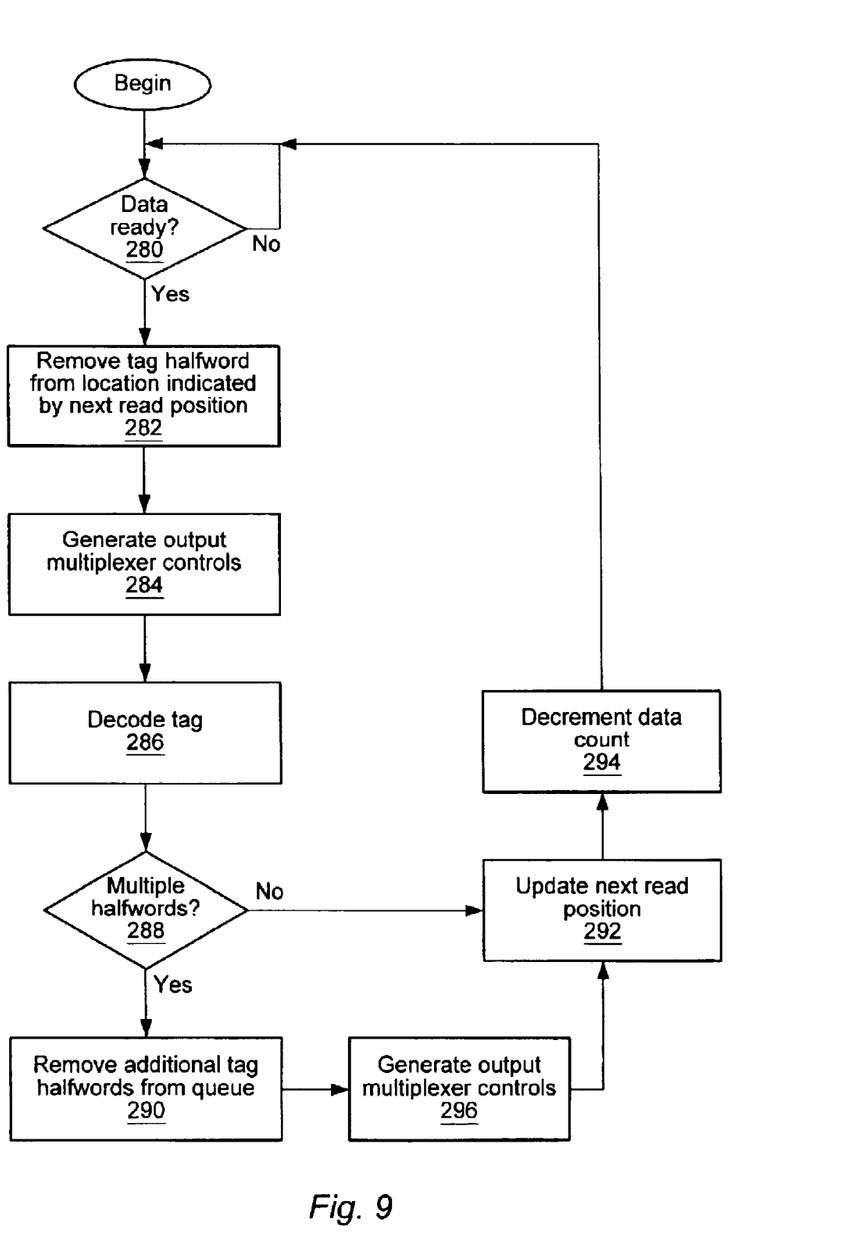
FIG. 9 is a flow diagram illustrating one embodiment of a method for retrieving tag data from the tag queues.

Referring now to FIG. 9, a flow diagram representing one embodiment of a method for retrieving tag information from the tag queues 202 is illustrated. This method may be used in conjunction with the method illustrated in FIG. 8 and described above, to manage the flow of tag data through the tag queues 202. Some features of this method for retrieving tag information (i.e., available data flag, data count, and next read position) are also employed in the method for storing tag data as described above. Hence, referring to the preceding description of a method for storing tag data will aid in understanding the following description.

The process may initially be stalled in an idle state or idle loop while waiting for valid data to become available in the tag queues (step 280). Once the presence of valid tag data is indicated by the data ready flag, a single tag word may be removed from the tag queues 202 (step 282). The next read position may be used in generating the correct output multiplexer control signals, affecting the justification and the output of the tag (step 284).

The first tag may be decoded, and information extracted or inferred from tag data which may indicate that the tag includes more than one halfword (e.g. register write tag uses three halfwords) (step 286). In some embodiments, this information as well as the number of words contained in the packet may be available in one of the vertex processor registers 208, or a separate queue. If it is determined that the tag includes more than one halfword (step 288), then the additional halfwords comprising the tag may also be removed from the FIFOs 232, and the appropriate output multiplexer control signals generated (step 296).

Once the initial tag halfword, and any additional halfwords required to complete the tag are removed from the queue, the next read position may be incremented by the number of halfwords removed (step 292). Finally, the data count may be decremented by the number of halfwords removed from the queue (step 294). The data count, as described earlier, may be incremented as data is stored in the FIFOs 232, and decremented as data is removed, thus providing an indication not only of valid data present in the queue, but also of the amount of available storage space remaining in the queue. Testing the data count against a predetermined high-water mark (not shown in FIGS. 8 and 9) may then allow for stalling the media processor 14 and averting a potential overrun condition.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   a data bus having a width of n words of b bits, wherein the data bus is configured to convey data words in a series of sequential bus cycles, wherein the number of data words conveyed in each bus cycle is less than or equal to n, wherein n and b are positive integers, wherein n is greater than or equal to two;
   a data queue coupled to the data bus, and configured to receive and store the data words, wherein the data queue is subdivided into n independent FIFO memories, and wherein no more than one data word of b bits is stored in each FIFO memory in a bus cycle; and
   a state machine coupled to the data queue, and configured to detect and retrieve data words stored in the FIFO memories, wherein the state machine maintains the sequence of the data words as part of retrieving the data words from the FIFO devices;
   wherein the data queue further comprises n input multiplexers, wherein each input multiplexer selects one data word and conveys the selected data word to one FIFO memory in response to external control signals, wherein the control signals are generated to form a regular, continuous and repeating pattern of FIFO memory usage, wherein each FIFO memory stores one data word for every n data words received by the data queue.

2. The graphics system of claim 1, wherein at least a subset of the data words comprise geometric primitive information.

3. The graphics system of claim 2, wherein the graphics system further comprises a rendering unit, wherein the rendering unit is configured to receive and process geometric primitives, wherein the rendering unit generates displayable pixels as part of processing the geometric primitives.

4. The graphics system of claim 3, wherein the rendering unit is further configured to output a stream of image data according to the geometric primitives, and wherein the graphics system further comprises one or more display devices configured to display an image according to the stream of image data.

5. The graphics system of claim 1, wherein the data bus is further configured to convey the data words synchronously, and wherein the data bus further comprises a set of enable bits, wherein the number of enable bits is equal to a multiple of n, and wherein the state of the enable bits indicate which portion of the data bus contains valid data words during a bus cycle.

6. The graphics system of claim 5, wherein the data queue is further configured to receive the enable bits, and store the data words according the state of the enable bits.

7. A graphics system comprising:
   a bus interface configured to receive a plurality of parallel data words, wherein the parallel data words are received as part of discrete bus transfer cycles, wherein each data word is marked as active or inactive, wherein the number of active data words received in one bus transfer cycle is variable; a circular buffer coupled to the bus interface, and configured to store the parallel data words, wherein only data words marked as active are stored; and
   a read sequencer coupled to the circular buffer, and configured to retrieve the stored data words, wherein the sequential relationship between data words is maintained as part of retrieving the stored data words;
   wherein the circular buffer comprises:
      detection logic coupled to the bus interface, and configured to output selection control signals in response to testing for active data words,
      a plurality of input selectors coupled to the bus interface and the detection logic, and configured to receive n parallel data words, wherein n is equal to the maximum number of data words which may be received in one bus transfer cycle, wherein the number of input selectors is equal to n, and wherein the input selectors are further configured to output one data word according to the selector control signals; and
      a plurality of storage devices coupled to the input selectors, and configured to receive and store data words, wherein the number of storage devices is equal to n, and wherein the storage devices are further configured as first-in-first-out memories.

8. The graphics system of claim 7, wherein at least a subset of the parallel data words comprise graphics data.

9. The graphics system of claim 7, wherein the data words are received in packets, wherein a packet comprises a preamble and a body, wherein the preamble comprises one or more data words, and includes at least one of the following; information which defines the type of data comprising the body, and information which defines the amount of data comprising the body.

10. The graphics system of claim 7, further comprising a write pointer coupled to the input selectors, and configured to indicate the storage device least recently accessed by a write operation, wherein the contents of the write pointer are combined with the output of the detection logic as part of generating the selector control signals.

11. The graphics system of claim 10, wherein the contents of the write pointer are not modified by a write operation if the write operation accesses all of the storage devices.

12. The graphics system of claim 7, wherein the read sequencer further comprises a plurality of output selectors, wherein each output selector is configured to output one data word in response to an external signal.

13. The graphics system of claim 7, wherein the read sequencer further comprises a read pointer configured to indicate the storage device least recently accessed by a read operation, wherein the contents of the read pointer are not modified by a read operation if the read operation accesses all of the storage devices.

14. A graphics system comprising:
a data bus, wherein the data bus is configured to convey data words in a series of sequential bus cycles, wherein the number of data words conveyed in each bus cycle is less than one plus n, wherein n times the width of one data word is equal to the width of the data bus, wherein n is greater than or equal to two;
a data queue coupled to the data bus, wherein the data queue is configured to receive and store the data words, wherein the data queue is subdivided into n independent FIFO memories, and wherein no more than one data word is stored in each FIFO memory in a bus cycle;
wherein the data queue further comprises n input multiplexers, wherein each input multiplexer selects one data word and conveys the selected data word to one FIFO memory in response to external control signals, wherein the control signals are generated to form a regular, continuous and repeating pattern of FIFO memory usage, wherein each FIFO memory stores one data word for every n data words received by the data queue; and
a state machine coupled to the data queue, configured to detect and retrieve data words stored in the FIFO memories, wherein the state machine maintains a sequence of the data words as part of retrieving the data words from the FIFO devices, wherein a tag is included at the beginning of the sequence of words, wherein the tag is at least one data word;
wherein the tag includes identification information associated with subsequent data words in the sequence of data words.

15. The graphics system of claim 14, wherein the identification information indicates that at least a subset of the subsequent data words includes geometric primitive information.

16. The graphics system of claim 15, wherein the graphics system further comprises a rendering unit, wherein the rendering unit is configured to receive and process geometric primitives, wherein the rendering unit generates displayable pixels as part of processing the geometric primitives.

17. The graphics system of claim 16, wherein the rendering unit is further configured to output a stream of image data according to the geometric primitives, and wherein the graphics system further comprises one or more display devices configured to display an image according to the stream of image data.

18. The graphics system of claim 14, wherein the data bus is further configured to convey the data words synchronously, and wherein the data bus further comprises a set of enable bits, wherein the number of enable bits is equal to a multiple of n, and wherein the state of the enable bits indicate which portion of the data bus contains valid data words during a bus cycle.

19. The graphics system of claim 18, wherein the data queue is further configured to receive the enable bits, and store the data words according to the state of the enable bits.

20. The graphics system of claim 14, wherein the identification information indicates subsequent data words as one of: register write data, vertex data, or attribute data.

21. The graphics system of claim 14, wherein the tag includes processing information.

22. The graphics system of claim 21, further comprising:
a second data queue, wherein the second data queue is configured to receive and store data words;
wherein the processing information indicates that at least a subset of the subsequent data words to be conveyed to the second queue,
wherein the state machine is operable to convey the at least a subset of the subsequent data words to the second data queue.

23. The graphics system of claim 21, further comprising:
a mesh buffer;
wherein the processing information indicates that at least a subset of the subsequent data words to be conveyed to the mesh buffer,
wherein the state machine is operable to convey the at least a subset of the subsequent data words to the mesh buffer.

24. A method for packing graphics data, the method comprising:
detecting active data on a bus, wherein the active data includes a tag which includes information associated with a subset of the active data for use in a state machine;
storing the active data in an array of FIFO memory structures, wherein each FIFO memory structure of the FIFO memory structures stores a respective portion of the active data, wherein the FIFO memory structures are operable to receive the respective portions of the active data from the bus in a parallel fashion; and wherein each FIFO memory structure further comprises an input multiplexer, wherein each input multiplexer selects one data word and conveys the selected data word to the corresponding FIFO memory structure in response to external control signals, wherein the control signals are generated to form a regular, continuous and repeating pattern of FIFO memory usage;
outputting the active data from the array of FIFO memory structures;
in response to said outputting, reordering the portions of the active data from the array of FIFO memory structures, wherein said reordering maintains a sequential association of the portions of the active data.

25. The method of claim 24, further comprising:
the state machine requesting data;
a read controller receiving one or more signals from the state machine;
sending data from the array of FIFO memory structures to the state machine, in response to said receiving.

26. The method of claim 24, further comprising:
maintaining a data count, wherein the data count indicates an amount of data stored in the array of FIFO memory structures;
determining if the data count exceeds a high-water mark; and
generating a stall signal, if the data count exceeds the high-water mark.

27. The method claim of 24, further comprising:
determining if data is available in the array of FIFO memory structures; and
indicating that data is available in the array of FIFO memory structures, if data is available in the array of FIFO memory structures.

28. The method claim of 24, further comprising:
determining if data is available in the array of FIFO memory structures; and indicating that data is not available in the array of FIFO memory structures, if data is not available in the array of FIFO memory structures.

29. The method claim of 24, further comprising:

the state machine processing the tag.

30. The method claim of 29, wherein said processing includes determining identification information of the subset of the active data.

31. The method claim of 30, wherein the identification information includes one of: register write data, vertex data, or attribute data.

32. The method claim of 29, further comprising:

conveying the subset of the active data to a data queue, in response to said processing.

33. The method claim of 29, further comprising:

conveying the subset of the active data to a mesh buffer, in response to said processing.

34. The method of claim 24, wherein the active data includes a plurality of data words; and wherein each portion of the active data includes one or more data words.

35. A method for buffering geometric primitive data comprising:

receiving a plurality of portions of a packet of geometric primitive data in a parallel fashion, wherein the packet of geometric primitive data includes a tag which includes information associated with a subset of the packet of geometric primitive data for use in a state machine;

storing the plurality of portions of the packet of geometric primitive data in a FIFO storage, wherein the FIFO storage comprises a plurality of FIFO memory structures, wherein each FIFO memory structure further comprises an input multiplexer, wherein each input multiplexer selects one data word and conveys the selected data word to a corresponding FIFO memory structure in response to external control signals, wherein the control signals are generated to form a regular, continuous and repeating pattern of FIFO memory usage; and the state machine retrieving the packet of geometric primitive data from the FIFO storage, wherein the state machine uses the tag to maintain a positional interrelationship of the packet of geometric primitive data.

36. The method of claim 35, wherein at least two portions of the plurality of portions of a packet of geometric primitive data include differing amounts of data; and wherein the FIFO storage is operable to accommodate portions of the plurality of portions of a packet of geometric primitive data of differing amounts of data.

37. The method of claim 35, wherein the packet of geometric primitive data is divided into data words, wherein a maximum number of data words received in a packet of geometric primitive data is n, wherein each packet of geometric primitive data contains n data words, wherein n is an integer greater than or equal to two, and wherein at least a subset of the data words includes data usable for displaying a portion of an image.

38. The method of claim 37, wherein the subset data words including data usable for displaying a portion of an image are not contiguous within the packet of geometric primitive data, and wherein the data words retrieved from the FIFO storage space are contiguous.

* * * * *